Figure 1:
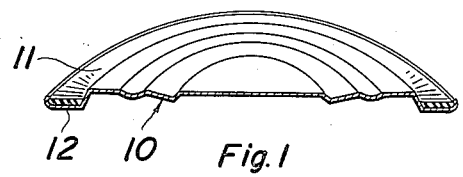

May 4, 1937.  W. A. KALBER  2,079,320

SEAL FOR CONTAINERS

Original Filed Feb. 7, 1935

Inventor
Wilfrid A. Kalber
By Theodore C. Browne
Attorney

Patented May 4, 1937

2,079,320

UNITED STATES PATENT OFFICE 2,079,320

SEAL FOR CONTAINERS

Wilfrid Andrew Kalber, Somerville, Mass.

Original application February 7, 1935, Serial No. 5,448. Divided and this application December 10, 1935, Serial No. 53,760

9 Claims. (Cl. 215—38)

This invention relates to container closures and has for its objects to produce a sealing means from latex or dispersion base compounds which is water resistant; to reduce the tendency of the compound to squeeze or extrude under pressure of the sealing rolls; and to prevent the tearing and scuffing of the seal on screw-top glass containers.

It is a further object of the invention to produce a substantial degree of water resistance and irreversibility of hydrophilic colloids in the presence of rubber latex or equivalent substances and to bring about this water resistance and irreversibility under predetermined conditions or at a predetermined time.

This application is a division of my copending application Serial No. 5,448, filed February 7, 1935. In the earlier application, I am claiming the sealing compound per se, and, in the present application, I am claiming the article comprising a container closure with a sealing gasket thereon formed from the compound claimed in the earlier application.

Figure 2:
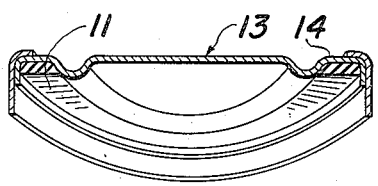
Figure 4:
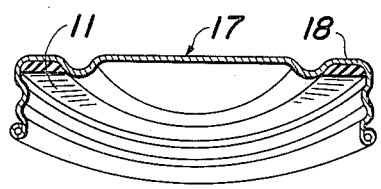
Figure 3:
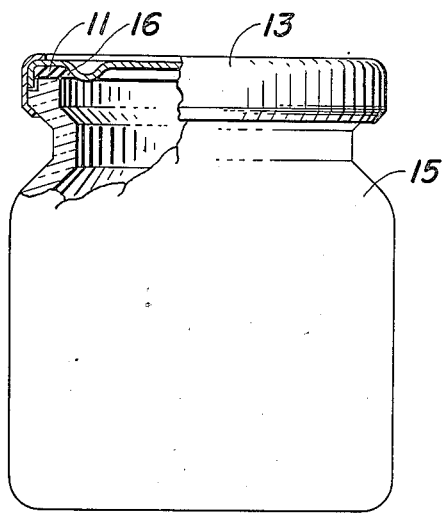
Figure 5:
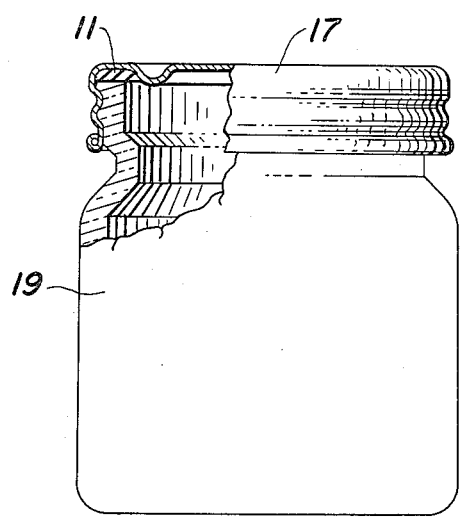

Referring to the drawing:

Figure 1 illustrates my improved sealing means when applied to a conventional can end, Figure 2 shows the sealing means when used with a skirted closure, Figure 3 shows the same closure applied to a glass jar, Figure 4 illustrates the sealing means in position in a screw-type cap, and Figure 5 illustrates the complete container, sealed with the cap illustrated in Figure 4.

A brief survey of the problems caused by the use of rubber in the can sealing art may help in understanding this invention. For this reason I would recall that rubber when dissolved in benzol produces an extremely viscous mass even at low concentration, consequently, in the lining of can ends, it was extremely difficult to deposit in the channel enough rubber from any rubber solution which was capable of passing through and of being applied by the nozzles of high speed lining machinery. On the other hand, latex contains amply sufficient rubber but flowed through the nozzles as easily as water and so could neither be applied properly on high speed machinery, nor held in place on the can end before it was dried.

In a patent granted to Dewey and Crocker No. 1,765,134, June 17, 1930, a method was disclosed of increasing the viscosity of latex to almost any degree desired, and also of imparting plasticity to the mixture. This made the application of the compound through nozzles practicable and it could be retained in the channels as the undried ends were moved about.

To accomplish these results Dewey and Crocker added a hydrophilic colloid which imparted viscosity to the mass and an inorganic colloidal substance which gave plasticity to the mixture. They called these addition agents "viscosity and plasticity factors". To this day, viscosity and plasticity factors are essential in latex-base can lining compounds. A considerable number of substances will accomplish these results, but essentially they all agree in this—each must form in water a grossly swollen hydrous gel. The very characteristic which makes these substances valuable in the compound and on the lining machine, however, causes difficulty when the dried down material is used as a sealing element in a container, for then these materials absorb water from the can contents or from the atmosphere of the processing chamber and the gasket softens. Thereafter, in double seam can closing, the seaming rolls may squeeze the softened material out of position as the can is closed, but if the sealing composition is used on detachable top or metal top glass containers, water absorption is continuous and a progressive softening action takes place which so reduces the cohesion of the sealing mass that it scuffs or even tears when the container is opened. Although this may never lead to container leakage and spoilage of the contents, it does lead to consumer complaints since the cap is ineffective for resealing the jar.

Since the appearance of the Dewey-Crocker Patent numerous other substances have been used to increase the viscosity and give the requisite plasticity to the sealing compound.

The viscosity promoting additives now used include the algins, glue, casein, Karaya and other gums. Plasticity promoting agents include wilkinite, bentonite, aluminum oxide, talc, asbestine and related substances. It should be noted that all these are hydrophilic in nature and their potential water absorption ultimately leads to a softened compound.

As Loeb and other workers in the field of colloid chemistry have shown, the addition of an electrolyte to a hydrophilic colloid first promotes swelling (water absorption) then, as the pH concentration rises, swelling diminishes until in many cases flocculation occurs. Flocculated colloids have lost their power of water absorption. In those cases where flocculation does not occur with increased ionic concentration, either chemical change takes place (with amphoteric colloids, particularly the proteins, relatively insoluble metallic salts are formed) or the water absorption of the colloid becomes so low as to be negligible.

It is my belief that these observed phenomena explain the mechanism of my invention, but whether they do or not, I wish to state as a fact that the hydrophilic substances used in lining compositions are much more water resistant after they have been acted upon by a high concentration of electrolyte than formerly.

One cannot overlook the fact that rubber latex is an essential ingredient of a Dewey-Crocker type lining compound—and that acidic electrolytes coagulate latex—nor can one neglect the fact that it is the ability of a hydrophilic colloid to form a gel which makes it of any value either as a viscosity or a plasticity factor. Consequently, my invention takes form in adding to an otherwise conventional lining compound a substance which neither flocculates the colloids nor coagulates the rubber until such flocculation or coagulation will do no harm.

Preferably, and because more accurate control is possible, I utilize a double salt which dissociates on increase of temperature or on increase of concentration, and I dissociate the salt by heating and/or drying the compound in the container end after the viscous, plastic substance has been applied.

If the toxicity of the substance and its compatibility with ammonia preserved latex are disregarded, I may effect a substantial waterproofing of the plasticity and viscosity factors with a very large number of substances, but of the limited number of non-toxic substances compatible with ammonia-preserved latex and with the hydrophilic viscosity and plasticity factors, I consider the zinc-ammonium salt to be the most effective. An ammonium-zinc double salt which is adapted to my purpose may be prepared by the reaction of ammonia on a solution of a zinc salt, such as zinc chloride, or zinc acetate, or by the reaction of ammonia and an ammonium salt on an aqueous suspension of zinc oxide. Thus, it is a familiar fact in chemistry that if ammonia water is slowly stirred into a solution of a zinc salt, there is first formed a white precipitate (zinc hydroxide) which redissolves with the addition of more ammonia. In the resulting solution, the zinc is commonly believed to exist as complex zinc double salt $(Zn(NH_3)_4Cl_2)$, and it is this type of zinc salt which I employ in the present invention. Many methods are known for the preparation of such salts and, as my invention is not, in its broader aspects, dependent on or limited by the method of preparation, it is unnecessary here to describe the general formation of the salt in great detail. Derivatives of ammonia, such as methyl amine or ethyl amine, which like ammonia form complex salts with zinc, may be substituted for ammonia in the present invention. Instead of a soluble zinc-ammonium salt, I may employ the nickel or cadmium ammonium double salt, but for reasons of economy and general practicability, I prefer the zinc salt.

My improved sealing compositions may be prepared by mixing a suitable quantity of a solution of the zinc salt with a latex sealing composition containing bentonite. Instead of bentonite, I may use numerous equivalents including finely powdered silica or alumina, and also the pulverized minerals asbestine and talc. But I prefer bentonite. In general, I employ a quantity of the zinc salt which contains an amount of zinc, expressed as zinc oxide, equivalent to from .2 of 1% to 1% of the total weight of the fluid sealing composition; but for most purposes I generally prefer to use about .5 of 1%. A larger quantity may be desirable, however, for use with compounds such, for example, as those prepared from artificial dispersions of rubber if they contain an unusually large proportion of water-soluble ingredients; and conversely, a smaller quantity may be used when a lesser quantity of water-soluble constituents are present. I give two examples below to illustrate in detail the manner in which sealing compositions suited to my purposes may be made. By following the first set of directions a compound is produced which is particularly well adapted for use with closures for double seamed cans while the composition which I describe in the second example is best suited for use with closures for jars, or where a thicker sealing film or gasket is required.

*Example 1*

The following stock solutions are prepared: 14 parts by weight of bentonite are suspended in 86 parts of water. 4 parts of ammonium alginate (superloid) are dissolved in 96 parts of water. 30 parts of casein are dissolved in 70 parts of ammonium hydroxide (28%). 1 part of zinc oxid is dissolved in a mixture of 6.4 parts water and 4 parts of aqueous ammonia, 28% $NH_3$ in which there has been dissolved 3.2 parts of ammonium chloride, or equivalent amount of ammonium sulfate, ammonium acetate, benzoate or salicylate.

The sealing material is now prepared by compounding these solutions with efficient stirring in the following sequence:

| | Parts |
|---|---|
| Bentonite suspension | 12 |
| Ammonium alginate (superloid) solution | 13.5 |
| Ammonia water 28% $NH_3$ | 1 |
| Casein solution | 6 |

This combination is then added to 64 parts of rubber latex containing approximately 38% rubber solids together with such coloring matter as may be desired, and the whole stirred until perfectly uniform.

To this preparation there is added 6½ parts of the solution of the zinc ammonium double salt, and the compound is then ready for use as a latex sealing composition, in accordance with this invention.

*Example 2*

In addition to the stock solutions provided for in Example 1, there is prepared a slurry of 10 parts of titanium dioxide in 21.7 parts of water.

The cap compound is now prepared by mixing singly with efficient stirring in the following sequence:

| | Parts |
|---|---|
| Ammonium alginate (superloid) solution | 1.5 |
| Bentonite suspension | 5 |
| Ammonia water 28% $NH_3$ | 1 |
| Casein solution | 6 |
| Titanium slurry | 31.7 |

This mixture is then added to 49 parts of a latex high in rubber content, for example, one containing approximately 60% rubber solids. When uniformly mixed, there are added 6⅕ parts of the zinc ammonium double salt solution with rapid and efficient agitation.

The mixture is then ready for immediate use as a latex sealing composition, in accordance with this invention.

It will be understood that the latex compositions, described in the examples given above, to which the zinc salts are added in accordance with this invention, merely exemplify compositions which have been employed in the art and may be replaced by other latex sealing compositions containing bentonite or its equivalent.

Referring to the drawing, Figure 1 shows a portion of the conventional can end 10 in perspective and in section. The sealing compound 11 occupies the channel 12.

Figure 2 illustrates the manner of application of the sealing compound to a skirted container closure 13 shown partially in perspective and partially in section. The compound 11 occupies the channel 14.

In Figure 3, the skirted closure of Figure 2 is shown applied to a conventional glass package 15, such as a mayonnaise jar. A portion of the jar is broken away and the parts are shown in section to illustrate their relative arrangement. It will be noticed that there is a portion 16 of the sealing compound 11 which remains exposed to the contents of the jar. It is the absorption of moisture through this exposed portion of the sealing compound which, prior to my invention, has caused the gaskets to deteriorate.

In Figure 4, the compound is shown applied to a screw cap 17. The compound 11 occupies the channel 18.

In Figure 5 the screw cap is shown applied to a glass jar 19.

It is to be understood that the container closures, as well as the containers which I have shown are illustrative only of general types which are common in the trade. My invention is not limited to these specific combinations but finds general application, particularly in containers using a plastic or resilient sealing means, wherever the sealing element may in part become exposed to liquid contents.

The use of sealing compositions containing complex zinc salts in accordance with this invention presents no special difficulties. They may be applied to closures, dried, and the so prepared closures attached to the bodies of containers according to any of the usual procedures employed in the art. The heating or drying of the compound after it is placed on the closures reduces the ammonia concentration of the compound and causes the release of zinc cations from the zinc ammonium salt, and these cations serve to flocculate the plasticity factor, and to render water resistant the viscosity factor. The resulting seals are much more resistant, however, to the influence of water or aqueous media than seals made without the aid of this invention. They are not only less likely to develop leaks when employed with watery contents but, as previously suggested, are less subject to the objectionable extrusion encountered with some types of containers or the undesirable scuffing or tearing peculiar to other types.

What I claim is:

1. A container closure having a sealing element therein including rubber, a viscosity factor and a plasticity factor, both of said factors being made water resistant by the action of a cation thereon.

2. A container closure having a sealing element therein including rubber, the flocculated resultant product of the action of a cation on materials of the class comprising bentonite, talc, asbestine, titanium and aluminum oxides, and the water resistant resultant product of the action of a cation on materials of the class comprising glue, algins, Karaya and casein.

3. A container closure having a sealing element therein including rubber, the flocculated resultant product of the action of the zinc cation on materials of the class comprising bentonite, talc, asbestine, titanium and aluminum oxides, and the water resistant resultant product of the action of the zinc cation on materials of the class comprising glue, algins, Karaya and casein.

4. A container closure having a sealing element therein including rubber, the flocculated resultant product of bentonite and the zinc cation, and the water resistant resultant product of Karaya and the zinc cation.

5. A container closure having as a sealing element therein the coagulated resultant product of latex and a cation—the flocculated resultant product of a plasticity factor and a cation and the water resistant resultant product of a viscosity factor and a cation.

6. The process of producing water resistant container sealing elements which includes the successive steps of applying the sealing compound in the position finally desired and then flocculating a plasticity factor and reducing the water absorptive capacity of a viscosity factor contained in said compound by subjecting both factors to the action of a cation while said compound is in a plastic, water-containing stage.

7. The process of producing water-resistant container sealing elements from a container sealing compound containing bentonite and Karaya which includes applying the compound to a container end, flocculating the bentonite and rendering the Karaya less water absorptive by subjecting both to the action of a cation while said compound is in a plastic-water containing stage—and concomitantly drying the compound.

8. A container closure having a sealing element thereon including rubber, the flocculated resultant product of bentonite and the zinc cation, and the water resistant resultant product of the zinc cation with ammonium alginate and casein.

9. A container closure having a sealing element thereon including rubber, the flocculated resultant product of the zinc cation with bentonite and titanium dioxide, and the water resistant resultant product of the zinc cation with ammonium alginate and casein.

WILFRID ANDREW KALBER.